United States Patent
Dharawat

(10) Patent No.: US 10,481,667 B2
(45) Date of Patent: *Nov. 19, 2019

(54) METHOD AND APPARATUS FOR ADJUSTING A SLEEP MODE DISPLAY MECHANISM OF AN ELECTRONIC DEVICE

(71) Applicant: Google Technology Holdings LLC, Mountain View, CA (US)

(72) Inventor: Parikshit Dharawat, Sunnyvale, CA (US)

(73) Assignee: GOOGLE TECHNOLOGY HOLDINGS LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/787,367

(22) Filed: Oct. 18, 2017

(65) Prior Publication Data

US 2018/0039318 A1 Feb. 8, 2018

Related U.S. Application Data

(63) Continuation of application No. 14/456,031, filed on Aug. 11, 2014, now Pat. No. 9,823,725.

(51) Int. Cl.

| | | |
|---|---|---|
| *G06F 1/32* | (2019.01) | |
| *G06F 1/3215* | (2019.01) | |
| *G06F 1/3234* | (2019.01) | |
| *G06F 1/3287* | (2019.01) | |
| *G06F 1/3293* | (2019.01) | |

(52) U.S. Cl.
CPC .......... *G06F 1/3215* (2013.01); *G06F 1/3265* (2013.01); *G06F 1/3287* (2013.01); *G06F 1/3293* (2013.01); *Y02D 10/122* (2018.01); *Y02D 10/153* (2018.01); *Y02D 10/171* (2018.01); *Y02D 50/20* (2018.01)

(58) Field of Classification Search
CPC .... G06F 1/3215; G06F 1/3265; G06F 1/3287; G06F 1/3293; Y02D 10/122; Y02D 10/153; Y02B 10/171; Y02B 50/20

See application file for complete search history.

(56) References Cited

U.S. PATENT DOCUMENTS

| | | |
|---|---|---|
| 6,608,614 B1 | 8/2003 | Johnson |
| 6,900,458 B2 | 5/2005 | Tung et al. |
| 8,105,161 B2 | 1/2012 | Rasmussen |

(Continued)

FOREIGN PATENT DOCUMENTS

| | | |
|---|---|---|
| JP | 2003279927 A | 10/2003 |
| JP | 2003295184 A | 10/2003 |

(Continued)

OTHER PUBLICATIONS

Prosecution History from U.S. Appl. No. 14/456,031, dated Jun. 22, 2016 through Jul. 19, 2017, 56 pp.

*Primary Examiner* — Abdelmoniem I Elamin
(74) *Attorney, Agent, or Firm* — Shumaker & Sieffert, P.A.

(57) ABSTRACT

An electronic device performs a method for adjusting a sleep mode display mechanism. The method includes determining, responsive to a trigger, whether a trusted device is proximate to the electronic device. The method further includes adjusting a sleep mode display mechanism of the electronic device when the trusted device is determined to be proximate to the electronic device.

20 Claims, 5 Drawing Sheets

(56) References Cited

U.S. PATENT DOCUMENTS

| | | | |
|---|---|---|---|
| 8,179,034 B2 | 5/2012 | Potts et al. | |
| 8,406,818 B2 | 3/2013 | Roberts et al. | |
| 8,498,618 B2 | 7/2013 | Ayed | |
| 8,619,095 B2 | 12/2013 | Jaramillo et al. | |
| 8,638,939 B1 | 1/2014 | Casey et al. | |
| 8,774,145 B2 | 7/2014 | Lin et al. | |
| 8,787,830 B2* | 7/2014 | Moosavi | H04W 52/0254 455/41.1 |
| 9,063,731 B2 | 6/2015 | Heo et al. | |
| 9,230,486 B2 | 1/2016 | Klement et al. | |
| 9,325,203 B2 | 4/2016 | Nguyen | |
| 10,055,567 B2* | 8/2018 | Ulrich | G06F 21/34 |
| 2005/0052446 A1 | 3/2005 | Plut | |
| 2006/0001055 A1 | 1/2006 | Ueno et al. | |
| 2006/0209049 A1 | 9/2006 | Tanaka | |
| 2007/0046618 A1 | 3/2007 | Imai | |
| 2008/0141049 A1 | 6/2008 | Hassan et al. | |
| 2008/0284696 A1 | 11/2008 | Rosenblatt | |
| 2010/0225681 A1 | 9/2010 | Yoshida et al. | |
| 2010/0306693 A1 | 12/2010 | Brinda | |
| 2011/0273377 A1 | 11/2011 | Merz | |
| 2012/0040611 A1* | 2/2012 | Griffin | H04W 52/0254 455/41.1 |
| 2012/0245941 A1 | 9/2012 | Cheyer | |
| 2012/0250539 A1* | 10/2012 | Lin | H04W 4/21 370/252 |
| 2013/0121023 A1 | 5/2013 | Kwon et al. | |
| 2013/0225077 A1 | 8/2013 | Schultz et al. | |
| 2013/0295842 A2* | 11/2013 | Griffin | H04W 52/0254 455/41.1 |
| 2014/0013227 A1 | 1/2014 | Friedlander et al. | |
| 2014/0059365 A1 | 2/2014 | Heo et al. | |
| 2014/0118272 A1 | 5/2014 | Gunn | |
| 2014/0184518 A1 | 7/2014 | Valavi et al. | |
| 2015/0102992 A1 | 4/2015 | Klement et al. | |
| 2015/0156716 A1* | 6/2015 | Raffle | G02B 27/017 455/418 |
| 2015/0181014 A1* | 6/2015 | Gerhardt | G07C 9/00309 455/420 |
| 2015/0347738 A1* | 12/2015 | Ulrich | G06F 21/35 726/17 |
| 2016/0041593 A1 | 2/2016 | Dharawat | |

FOREIGN PATENT DOCUMENTS

| | | |
|---|---|---|
| JP | 2006235464 A | 9/2006 |
| KR | 20050024116 A | 3/2005 |
| WO | 2014035119 A2 | 3/2014 |

* cited by examiner

METHOD AND APPARATUS FOR ADJUSTING A SLEEP MODE DISPLAY MECHANISM OF AN ELECTRONIC DEVICE

RELATED APPLICATION

This application is a continuation of U.S. application Ser. No. 14/456,031, filed Aug. 11, 2014, now U.S. Pat. No. 9,823,725, the entire contents of each of which are hereby incorporated by reference.

FIELD OF DISCLOSURE

The present disclosure relates generally to electronic devices having displays and more particularly to a method and apparatus for adjusting a sleep mode display mechanism of an electronic device.

BACKGROUND

A sleep mode for an electronic device allows the device to conserve power, and therefore battery life, without powering off. Contrasted against a normal operating mode for the device, the sleep mode consumes less power but also limits both the operations the device can perform and user interactions the device recognizes. The sleep mode and the normal operating mode represent opposite sides of a balance between efficiency and functionality.

For example, while in the sleep mode, some electronic devices have reduced functionality of a display component of the device, which can be used to alert a user of incoming messages. However, opportunities remain to enhance the user's experience with the display functionality, during the sleep mode, while still conserving power and battery life of the electronic device.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

Figure 1:
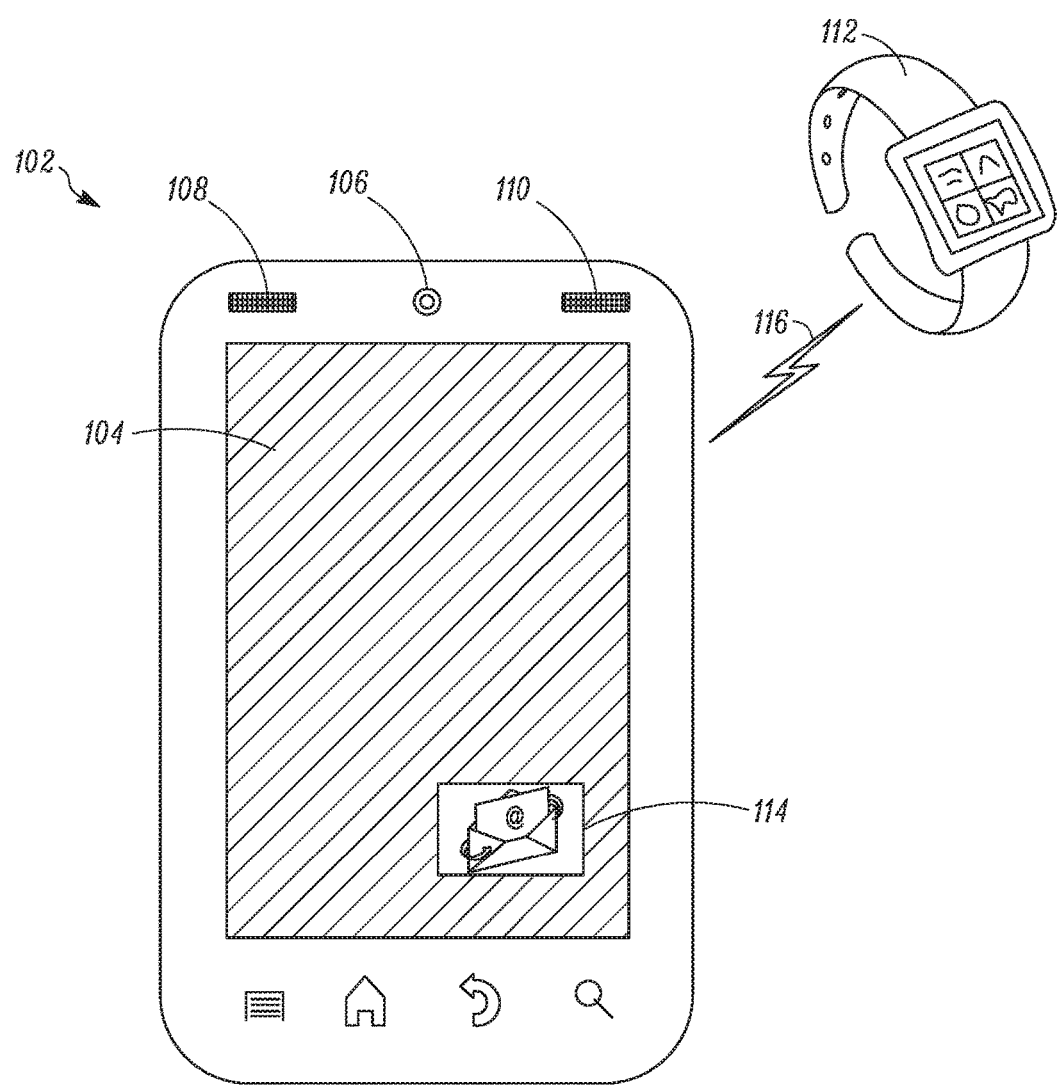
FIG. 1 is a schematic diagram illustrating an electronic device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Generally speaking, pursuant to the various embodiments, an electronic device is configured to adjust a sleep mode display mechanism of the electronic device. For one embodiment, a method includes determining, responsive to a trigger, whether a trusted device is proximate to the electronic device. The method further includes adjusting a sleep mode display mechanism of the electronic device when the trusted device is determined to be proximate to the electronic device.

In accordance with another embodiment, an electronic device includes: a primary processor; a secondary processor coupled to the primary processor; a display component coupled to the primary and secondary processors; and a sensing component coupled to one of the primary processor or the secondary processor or to both. The primary processor is configured for a sleep mode and an awake mode. In a particular embodiment, the secondary processor is configured to operate using lower power than the primary processor. Moreover, the sensing component in combination with the at least one of the primary processor or secondary processor is configured to: determine, responsive to a trigger, whether a trusted device is proximate to the electronic device; and adjust a sleep mode display mechanism of the electronic device when the trusted device is determined to be proximate to the electronic device.

For example, while the primary processor of the electronic device operates in a sleep mode and a trusted device is in the vicinity of the electronic device, when a user receives an incoming message, instead of displaying an icon the electronic device displays expanded content of the incoming message without the user having to physically interact with the electronic device. This facilitates convenience and ease of use for the user while still maintaining the user's privacy with regards to the message contents.

Referring now to the drawings, and in particular FIG. 1, an electronic device (also referred to herein simply as a "device") implementing embodiments in accordance with the present teachings is shown and indicated generally at 102. Specifically, device 102 represents a smartphone that is shown to include: a touchscreen 104, a camera 106, and microphones 108, 110, e.g., left 108 and right 110 stereo microphones. Also shown, is a user notification icon 114 on the touchscreen 104 and another electronic device 112 connected at 116 to the electronic device 102.

While a smartphone is shown at 102, no such restriction is intended or implied as to the type of device to which these teachings may be applied. Other suitable devices include, but are not limited to: personal digital assistants (PDAs); portable media players (e.g., MP3 players); personal computing devices, such as tablets; and wearable electronic devices, such as devices worn with a wristband. For purposes of these teachings, a device can be any electronic apparatus that has a display component and is configured for a sleep mode. Moreover, device 112 is not limited to a smartwatch, as shown, but can be any electronic device that is identified or detected as a "trusted device," which is, for instance, a device that was previously authenticated by the device 102. Accordingly, the device 112 can be another wearable device (e.g., a smartring, a headset, etc.), a tablet, and the like, which is capable of connecting to the electronic device 102 as a trusted device.

A sleep mode, as defined herein, indicates an operational state assumed by a device to conserve power over a normal operating state, also referred to herein as an awake mode, for the device. As the device enters the sleep mode, the device powers down but does not power off. In the sleep mode, for example, the device suspends some operations and/or cuts power to some of its hardware components as random access memory (RAM) for the device receives just enough power to maintain the data needed to resume normal operations during the awake mode for the device. If the power and/or operation of a hardware element, such as a processing element or a display component, within the device 102 is reduced or suspended during the sleep mode for the device 102, then that hardware element is also referred to herein as being in a sleep mode. Normal operations for a hardware element of the device are likewise referred to as the hardware element operating in the awake mode.

Figure 2:
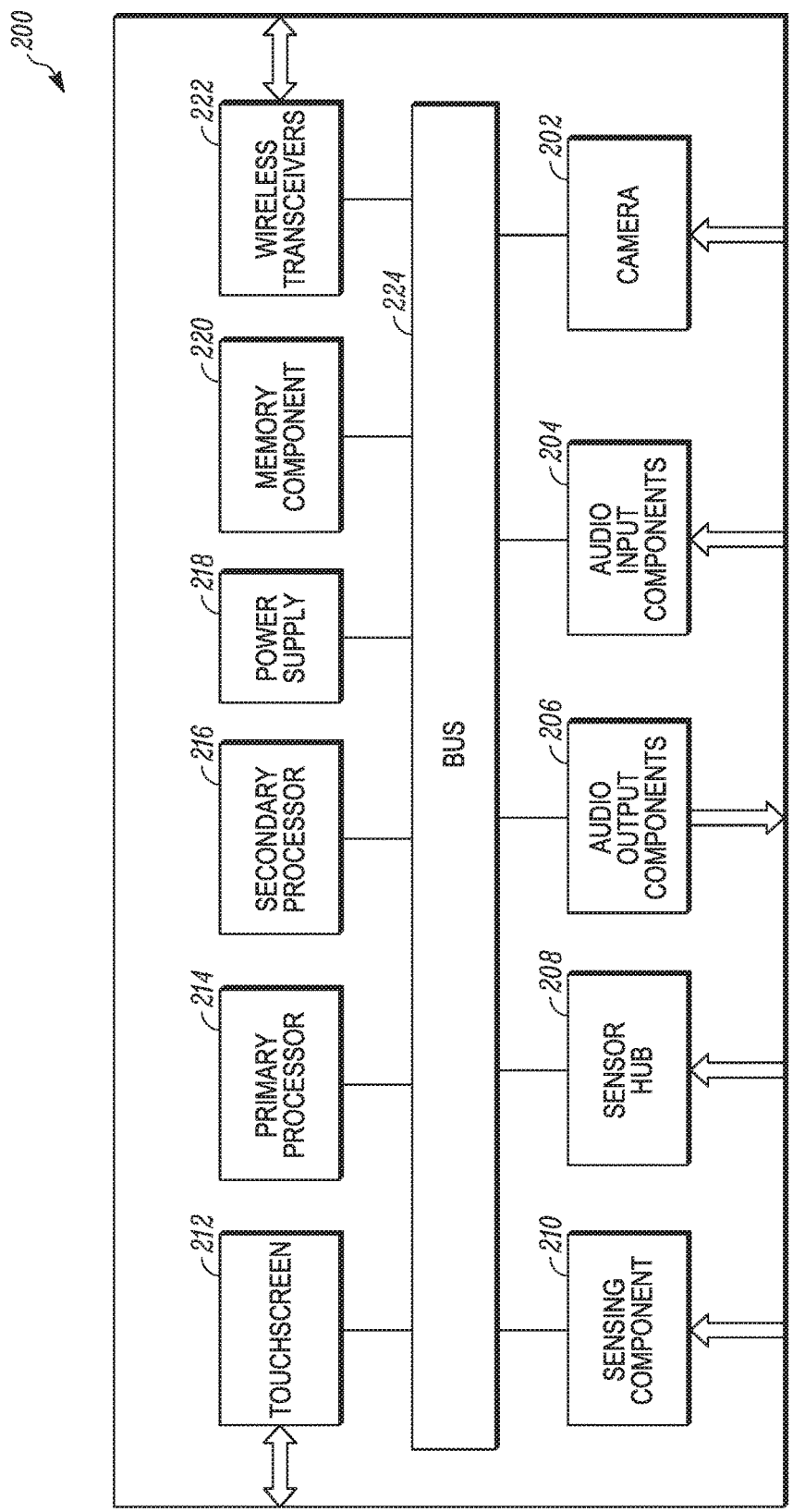
FIG. 2 is a block diagram illustrating internal hardware components of an electronic device configured for implementing embodiments in accordance with the present teachings.

Referring to FIG. 2, a block diagram for a device in accordance with embodiments of the present teachings is shown and indicated generally at 200. For one embodiment, the block diagram 200 represents hardware elements or components of the device 102. Specifically, the block diagram 200 shows: a camera 202, audio input components 204, audio output components 206, a sensor hub 208, a sensing component 210, a touchscreen 212, a primary processor 214, a secondary processor 216, Near Field Communication (NFC) apparatus 218, a memory component 220, and wireless transceivers 222, all operationally interconnected or coupled by a bus 224.

A limited number of device elements 202, 204, 206, 208, 210, 212, 214, 216, 218, 220, 222, and 224 are shown at 200 for ease of illustration, but other embodiments may include a lesser or greater number of such elements in a device, such as device 102. Moreover, other elements needed for a commercial embodiment of a device that incorporates the elements shown at 200 are omitted from FIG. 2 for clarity in describing the enclosed embodiments. Further, the bus 224 is an abstraction of one or more communication systems that transfer data and/or control signals between the device elements 202, 204, 206, 208, 210, 212, 214, 216, 218, 220, and 222. For embodiments where the element 224 represents multiple busses (e.g., multiple communication systems), some of the device elements 202, 204, 206, 208, 210, 212, 214, 216, 218, 220, and 222 are coupled to a single bus while others are coupled to multiple busses, in different combinations, to perform their functionality as described herein.

We now turn to a brief description of the hardware elements within the block diagram 200. In general, the sensing component 210 and the primary processor 214 and/or the secondary processor 216 are configured with functionality in accordance with embodiments of the present disclosure as described in detail below with respect to the remaining figures. "Adapted," "operative," "capable" or "configured," as used herein, means that the indicated elements are implemented using one or more hardware elements, which may or may not be programmed with software and/or firmware as the means for the indicated elements to implement their desired functionality. Such functionality is supported by the other hardware shown in FIG. 2, including the device elements 202, 204, 206, 208, 212, 218, 220, 222, and 224.

Continuing with the brief description of the hardware elements shown at 200, as included within the device 102, the processors 214 and 216 include arithmetic logic and registers necessary to perform the digital processing required by the device 102 to process data and operate in a manner consistent with the embodiments described herein. In particular, the primary processor 214 provides main or core processing capabilities within the electronic device 102 and, in an embodiment, serves as an application processor. For example, the primary processor 214 is implemented as a system-on-chip (SoC) that supports word processing applications, email and text messaging applications, video and other image-related and/or multimedia applications, short-range communication, etc., executable or implementable on the electronic device 102. The primary processor 214 is configured for a sleep mode when the electronic device 102 is in the sleep mode and is configured for an awake mode when the electronic device 102 is in the awake mode. For an embodiment, at least some functionality of the primary processor 214 is suspended while in the sleep mode.

The secondary processor 216 is a separate processor that, in an embodiment, handles peripheral or supportive processes for the primary processor 214. For example, the secondary processor 216 monitors input into microphones 108, 110 in order to perform its functionality according to at least one embodiment. In a particular embodiment, the secondary processor 216 supports processes that require less processing power than those performed by the primary processor 214, allowing for continued operation of the device 102 while the primary processor 214 is in the sleep mode. Accordingly, it can be said that the secondary processor 216 is configured to operate using lower power than the primary processor 214.

In an embodiment, the primary processor 214 and the secondary processor 216 are operationally coupled by the bus 224, which includes a communications link supporting one or more standard or proprietary protocols for communicating data, control signals, and/or clock signals between the processors 214 and 216. For a particular embodiment, the communications link is supported by a bidirectional Mobile Industry Processor Interface (MIPI). MIPIs support numerous protocols including, but not limited to M-PHY, D-PHY, Display Serial Interface (DSI), MIPI Unified Protocol (UniPro), Low Latency Interface (LLI), SuperSpeed Inter-chip (SSIC), and Camera Serial Interface (CSI), to name a few. MIPI is a chip-to-chip interface that conforms to standards created by the MIPI Alliance Standards Body, which standardizes interfaces for mobile applications.

The display component 212 incorporates a touchscreen such as the touchscreen 104 and, thereby, serves multiple functions. Accordingly, the display component 212 is also referred to herein interchangeably as the touchscreen 212. In an alternative embodiment, the device 102 has no touchscreen, and a user interacts with the device 102, for instance in response to items shown on the display component 212, using other input components (not shown) such as keypads, keyboards, buttons, etc.

The touchscreen 212 provides a means for receiving tactile (or touch) input from a user's finger or some other input device, such as a stylus. In particular embodiments, the touchscreen 212 can operate in accordance with any suitable technology for sensing touch such as, by way of example, a resistive touchscreen or a capacitive touchscreen. The touchscreen 212 is operationally coupled to the primary processor 214 and the secondary processor 216 using the bus 224, which in an embodiment includes communication interfaces (not shown) for communicating data between the touch screen 212 and the primary and secondary processors 214, 216.

The touchscreen 212 can also display data, as indicated by the e-mail notification icon 114 on the touchscreen 104 of FIG. 1. For an embodiment, the touchscreen 104 is a liquid crystal display (LCD) that translates electrical signals it receives into a given image. Each pixel of the image 114, for example, can correspond to a capacitor within the touchscreen 104 that is charged and slowly discharged to display the icon 114.

Moreover, the display component 212 is configured for a sleep mode, wherein, for instance, some functionality of the display component is reduced and/or the display component 212 operates using lower power. The collective elements for controlling functionality of the display component 212 while the display component 212 and/or the primary processor 214 is in a sleep mode is referred to herein as a sleep mode display mechanism for the device 102. In one embodiment, the sleep mode display mechanism is controlled by a "privacy" setting for the electronic device, which determines what if anything is shown on the display component 212 when the display component 212 and/or the primary processor 214 is in a sleep mode. In a particular embodiment, the privacy setting can be manually set by a user or automatically set, adjusted, or overridden using the teachings herein.

In one example implementation, as shown in FIG. 1, the touchscreen 104 is in a sleep mode, wherein the data displayed thereon is controlled by the sleep mode display mechanism for the device 102. Accordingly, a primary portion of the touchscreen 104 is not illuminated, as indicated by the shading at 104. For an embodiment, the limited functionality of the touchscreen 104 while in the sleep mode allows it to intermittently display an interactive notification, such as the e-mail notification icon 114. For instance, the device 102 receives an e-mail while in a sleep mode. Without powering up the entire touchscreen 104, the device 102 displays a small notification icon in the lower-right portion of the touchscreen 104, as shown at 114, that fades in and out of view for a period of time. This intermittent displaying of an interactive notification icon while the device 102 is in a sleep mode is referred to herein as "breathing."

The period of time the icon 114 breathes is sufficient to allow a user to tap (or otherwise make contact with) the touchscreen 104, for instance, at the location of or in a vicinity of the icon 114, to view or "peek" at additional information about the e-mail. When the breathing icon 114 is tapped, the device 102 momentarily displays pre-selected content from the email, including but not limited to the e-mail's subject line and sender, at the location of the icon 114. If the user chooses to do so, he can wake the device 102 from its sleep mode and read the e-mail.

In an embodiment according to the present teachings, the device 102 is configured to adjust this breathing functionality of the sleep mode display mechanism, such as by not requiring the user to tap on or near the icon 114 to display additional content or by displaying more content than the pre-selected content when the user taps on or near the icon 114. The device 102 can also adjust other aspects of the sleep mode display mechanism as explained in detail by reference to the remaining figures.

In addition to being operationally coupled to one another and to the display component 212, in an embodiment, the primary processor 214 and the secondary processor 216 are operationally coupled via the bus 224 to elements 202, 204, 208, and 210, enabling the processors 214, 216 to monitor the elements 202, 204, 208, and 210 for input in order to perform functionality in accordance with the present teachings. In a particular embodiment, the primary processor 214 is configured to monitor one or more of the elements 202, 204, 208, 210 while in an awake mode. In another embodiment, the secondary processor 216 is configured to monitor one or more of the elements 202, 204, 208, 210 while the primary processor 214 is in a sleep mode. In a further embodiment, the primary processor 214 is configured to monitor one or more of the elements 202, 204, 208, 210 while in the sleep mode.

Camera 202 represents an optical input module that allows the device 102 to capture images in the vicinity of the device 102 and to convert those images to image data that can be processed by the primary 214 and/or secondary 216 processor. Image data represents the informational content of an image, or a set of images, independent of its encoded format. In a first example, the camera 202 captures an image of a user's face, and the primary 214 or secondary processor 216 confirms the user as an authorized user of the device. In a second example, the primary 214 or secondary 216 processor processes sequentially captured images to determine that an object is moving in the vicinity of the device 102.

One or more audio input components 204, such as the microphones 108 and 110, enable the device 102 to receive acoustic input. For an embodiment, microphones 204 allow a user to interact with the device 102 through speech. The device 102 can accept a set of verbal commands, for example, or be programmed to detect and react to non-verbal sounds. Particular sounds, for instance, can indicate that a user is in proximity to the device 102 and can, thereby, serve as an audio trigger for the device 102 to detect proximity of a trusted device.

The sensor hub 208 contains one or more sensors including, but not limited to, a proximity sensor, a motion sensor, a touch sensor, a gyroscope, an accelerometer, an ambient light sensor, an infrared sensor, etc. One or more of these sensors can be used to determine: an object's distance from the electronic device 102 or whether the device 102 is touching the object; whether the device 102 is moving; whether the device 102 has been picked up or laid down; whether the device 102 has been placed in or removed from a pocket or purse; etc.

For example, a user's or trusted device's proximity to the device 102 can be detected by one or more proximity sensors, which can be active and or passive. For an embodiment, an active proximity sensor determines a proximity or distance to an object by measuring the time it takes for a signal, such as a light signal, transmitted by the device 102 to be detected by the device 102. For another embodiment, a passive proximity sensor detects a signal, such as an infrared or thermal signal, emanating from a user or an electronic signal being transmitted by a separate device, such as a trusted device, carried on the user's person, to determine proximity. In another embodiment, the camera 106 of device 102 is used to perform the function of the proximity sensors.

In another example, one or more motion sensors can allow the device 102 to determine its motion relative to its environment. For a particular implementation, the motion sensors allow the device 102 to determine its position, velocity, acceleration, additional derivatives of position with respect to time, and average quantities associated with the aforementioned values. From the input of one or more touch sensors, the device 102 can determine if it is in contact with another object. The device 102 can be placed on a table, for instance, or held in a user's hand.

The sensing component 210 represents the hardware used in combination with the primary 214 and/or secondary 216 processor to determine whether a trusted device is proximate to the electronic device 102. For example, the sensing component detects the device 112 and performs further protocols to identify the device 112 as a trusted device. In one example, the sensing component includes a short-range communication component to determine whether the device 112 is a trusted device that is proximate to the electronic device 102. A short-range communication component implements a short-range communication technology, embodied in one or more standard or proprietary protocols, to communicate with a similarly enabled device over distances not exceeding 100 meters, in one embodiment.

In particular embodiments, the short-range communication component is Bluetooth-enabled, Near Field Communication (NFC)-enabled, or both to determine whether a trusted device is proximate to the electronic device. Accordingly, the Bluetooth-enabled sensing component 210 can include a Bluetooth transceiver, for instance as one of the transceivers 222, to receive signals from the device 112 using the Bluetooth or Bluetooth Low Energy standard protocol embodied in Institute of Electrical and Electronics Engineering (IEEE) standard 802.15.1, wherein the signals include information that allows the device 102 to identify the device 112 as a trusted device. Additionally or alternatively, the NFC-enabled sensing component 210 includes the NFC apparatus 218 to receive signals from the device 112 using the NFC standard protocol embodied in International Organization for Standardization (ISO) standard 13157, etc., wherein the signals include information that allows the device 102 to identify the device 112 as a trusted device.

The audio output component 206 includes one or more speakers, such as the speakers 108, 110 and can include other components like buzzers and the like. The memory component 220 represents a storage location that is accessible to the primary 214 and secondary 216 processors. In one embodiment, the memory component 220 represents cache memory integrated with processors. In another embodiment, the memory component 220 represents a portion of Random Access Memory (RAM) for the device 102.

The wireless transceivers 222 include one or more transceivers that allow the device 102 to wirelessly communicate with other devices. For example, transceivers 222 enable the device 102 to upload and download data to and from one or more networks, such as a wireless local area network (WLAN) or a cellular network. A WLAN transceiver 222 allows the device 102 direct access to the Internet using standards such as Wi-Fi, which is offered at hotspots. For embodiments where the wireless transceiver 222 includes a cellular transceiver, cellular networks can use any wireless technology that, for example, enables broadband and Internet Protocol (IP) communications including, but not limited to, $3^{rd}$ Generation (3G) wireless technologies such as CDMA2000 and Universal Mobile Telecommunications System (UMTS) networks or $4^{th}$ Generation (4G) or pre-4G wireless networks such as LTE and WiMAX. For a further embodiment, the transceivers 222 include a Bluetooth-enabled transceiver as previously mentioned.

Figure 3:
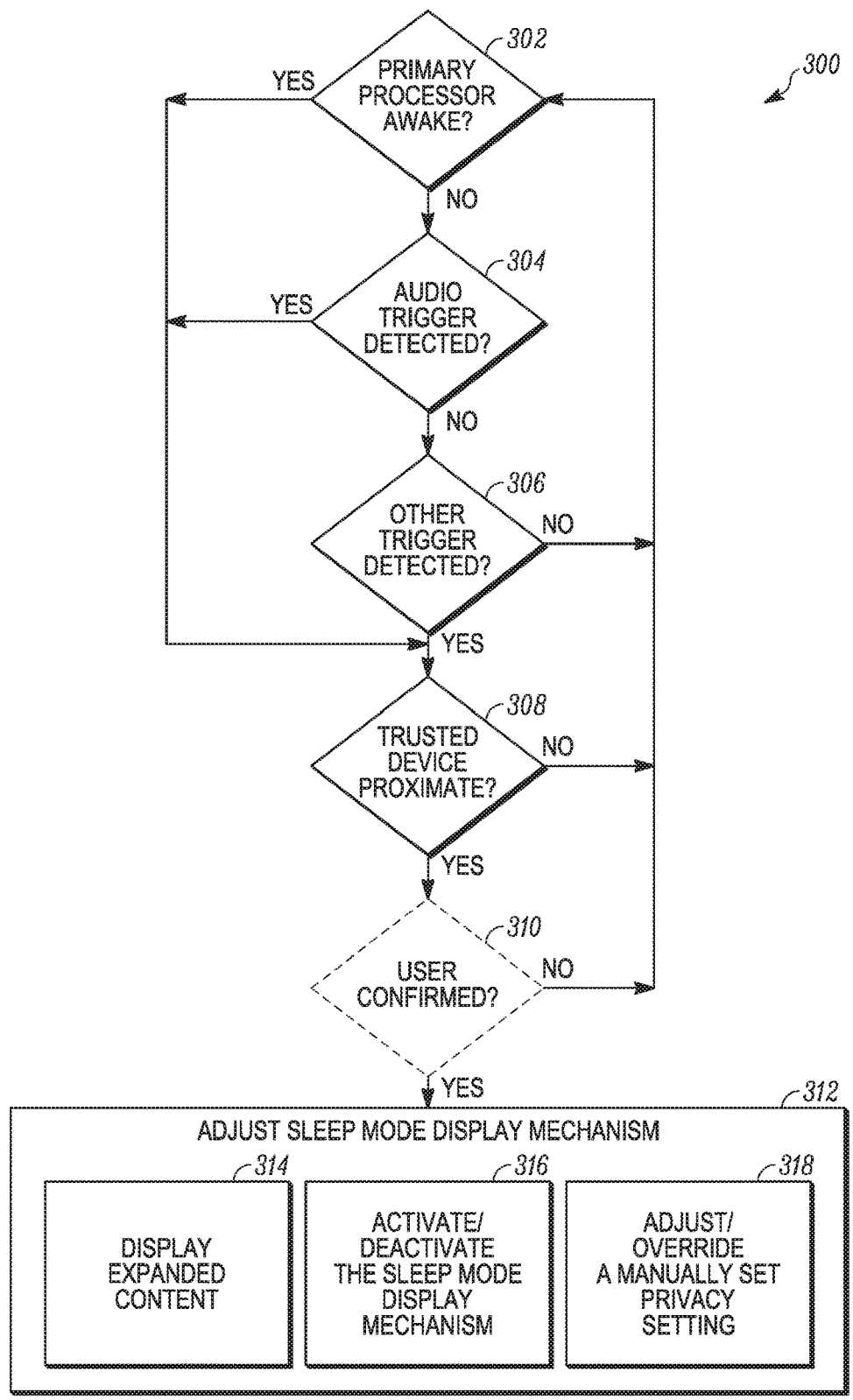
FIG. 3 is a logical flowchart illustrating a method for adjusting a sleep mode display mechanism of an electronic device in accordance with an embodiment.

We turn now to a detailed description of the functionality of the device 102 and the device elements 200 shown in FIGS. 1 and 2, respectively, in accordance with the teachings herein and by reference to the remaining figures. FIG. 3 is a logical flow diagram illustrating a method 300 in accordance with the present teachings performed by an electronic device, taken to be the electronic device 102 for purposes of this description, for adjusting a sleep mode display mechanism of the electronic device 102.

To start the method 300, the electronic device 102 detects or receives a trigger, in response to which the device 102 determines 308 whether a trusted device is proximate to the electronic device 102. The device 102 could continuously monitor for a single trigger or for multiple triggers, for instance in accordance with functional blocks 302, 304, and 306. The receipt or detection of one or more of the triggers, e.g., 302, 304, or 306, causes the device 102 to determine 308 whether a trusted device is proximate to the electronic device 102.

For one embodiment, the trigger includes the primary processor 214 of the electronic device 102 awakening from a sleep mode for a first time duration to perform a function before returning to the sleep mode. For example, when the primary processor 214 is in the sleep mode, it awakens at the onset of predefined time intervals to perform the function of downloading content, such as multimedia messages addressed to a user of the device 102, from a remote server before returning to the sleep mode. The primary processor 214 can be configured to perform other functions during these periodic times intervals such as clearing out messages or other regular maintenance. When the device 102 determines 302 that one of these predefined time intervals has started, the device 102 determines 308 whether a trusted device is proximate to the electronic device 102.

For another embodiment, the trigger is an audio trigger detected while the primary processor 214 of the electronic device 102 is in the sleep mode. Namely, the device 102 determines 304 whether an audio trigger has been detected to cause the device 102 to determine 308 whether a trusted device is proximate to the electronic device 102. For example, while the primary processor 214 is in the sleep mode, the secondary processor 216 is configured to monitor input into the audio input component 204, e.g., the microphones 108 and 110, for certain utterances or spoken words or phrases that serve as the audio trigger to initiate detection 308 for the proximity of a trusted device. For a particular embodiment, the device 102 performs voice recognition to determine that the spoken word or phrases emanated from a particular or authorized user in order to serve as the audio trigger. Where triggers 302 and 304 are not present, the device 102 may detect 306 for the presence of other triggers.

For some implementation scenarios, the detecting 308 for the trusted device uses more power than is available to the secondary processor 216 or uses hardware components that are not operationally coupled to the secondary processor 216, or the device 102 does not include a secondary processor or includes a secondary processor that is not configured for the detecting 308 function. Therefore, the primary processor 214 performs the function of determining 308 whether the trusted device is proximate, which can be done for instance when the primary processor 214 periodically awakens at 302 to perform a scheduled function. If the primary processor 214 determines 308 that the trusted device is proximate to the electronic device 102, the primary processor 214 can adjust 312 the sleep mode display mechanism for the device 102 or signal the secondary processor 216 to perform such adjusting.

Figure 4:
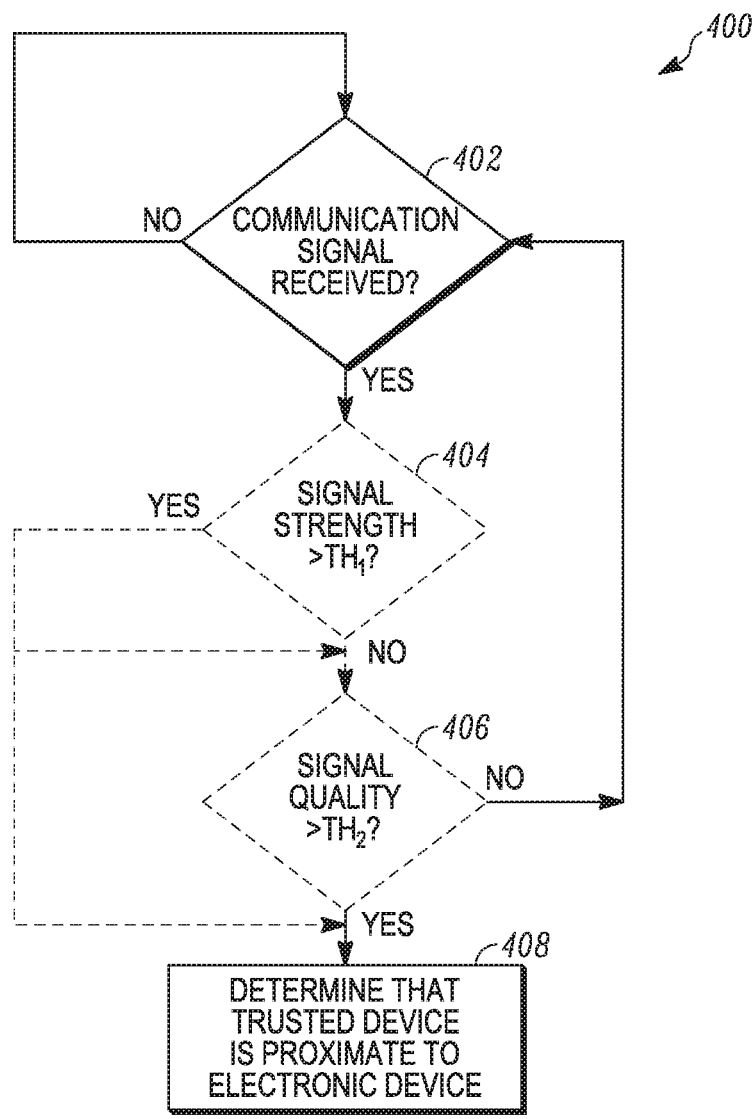
FIG. 4 is a logical flowchart illustrating a method for determining whether a trusted device is proximate to an electronic device in accordance with an embodiment.

For one example, the device 102 uses the Bluetooth transceiver 222 operationally coupled to the primary processor 214 as the sensing component 210 to detect 308 for the presence of a trusted device. Accordingly, when the primary processor 214 awakens at 302, the primary processor 214 monitors for a Bluetooth signal that identifies a connected device as a trusted device. FIG. 4 shows a flow diagram illustrating a method 400, in accordance with an embodiment, for using a short-range communication component as the sensing component 210 to detect 308 for the proximity of a trusted device. For multiple embodiments, determining 308 whether the trusted device is proximate to the electronic device 102 includes determining 402 whether a short-range communication signal has been received from the trusted device.

Specifically, where the sensing component 210 includes the Bluetooth apparatus, the primary processor 214 monitors 402 the Bluetooth apparatus to detect a connection 116 to another device, such as the device 112, and for receipt of a Bluetooth signal over the connection 116. In an example implementation, the primary processor 214 authenticates the device 112 as a trusted device using information in the Bluetooth signal received over the connection 116. Since Bluetooth signals may have a signal range of up to 100 meters, the device 102 may take further measures to determine 308 whether the detected trusted device 112 is "proximate" or close enough to the electronic device 102 to modify or adjust the sleep mode display mechanism for the device 102. The concern is maintaining the user's privacy for received messages. If too much data is displayed when the trusted device 112 is far enough away for unauthorized users to inadvertently or purposefully view the data, privacy can be compromised for the authorized user.

Therefore, for one embodiment, the primary processor 214 determines 408 that the trusted device 112 is proximate to the electronic device 102 where either a signal strength (e.g., received signal strength indication (RSSI)) or a signal quality (e.g., signal-to-noise ratio (SNR)) or both of the received Bluetooth signal exceeds a corresponding threshold. Accordingly, for a particular embodiment, the primary processor 214 compares 404 the RSSI to a signal strength threshold $TH_1$ and compares 406 the SNR to a signal quality threshold $TH_2$. Where one or both thresholds are exceeded, depending on the particular implementation details, the primary processor 214 determines 408 that the trusted device 112 is proximate to the electronic device.

For another embodiment where the device 102 uses the NFC apparatus 218 as the sensing component 210, a modified version of method 400 can be used to detect 308 for the presence of the trusted device 112. In this embodiment, either the primary processor 214 or the secondary processor 216 might be configured to perform the detecting 308. For a first particular embodiment, the primary processor 214 performs the detecting upon periodically awakening 302 to perform another function such as downloading messages. For a second embodiment, the secondary processor 216 performs the detecting 308 for the proximity of the trusted device 112 after detecting 304 an audio trigger.

Further to the second embodiment, the secondary processor 216 monitors 402 the NFC apparatus for a connection 116 and for receipt of an NFC signal over the connection 116. When an NFC signal is received that identifies an authorized or trusted device, the secondary processor determines 408 that the trusted device is proximate to the electronic device 102. In this embodiment, since the range for detecting NFC signals is less than 0.2 meters, the connected trusted device 112 can be considered close enough not to compromise the user's privacy.

For an additional embodiment, the electronic device 102 uses other mechanisms to determine 308 whether a trusted device is proximate to the electronic device 102. Some of these embodiments may involve the device 102 confirming 310 that the user of the device 102 is an authorized user. For example, the device 102 might detect the presence of an external device using proximity sensors within the sensor hub 208 and then determine that the external device is a trusted device by confirming that the external device is on the person of an authorized user. Such determining of an authorized user could, for instance, be by way of voice recognition using the audio input components 204 or facial recognition using the camera 202.

Even where the connected device is identifiable as a trusted device based solely on information received in a signal from the external device, the electronic device 102 might still confirm 310 that an authorized user is carrying the external device. This additional user verification 310 could, for instance, be performed depending on the particular manner in which the device 102 adjusts 312 the sleep mode display mechanism. This is because some adjustments can create a larger risk for compromising privacy than other adjustments.

For one embodiment, adjusting 312 the sleep mode display mechanism includes causing a displaying 314 of expanded content when the trusted device is proximate to the device 102 instead of first content that is displayed when the trusted device is distant (i.e., not determined to be proximate) from the electronic device 102. The details of this embodiment are described by reference to a method 500 illustrated by a flow diagram shown in FIG. 5.

Figure 5:
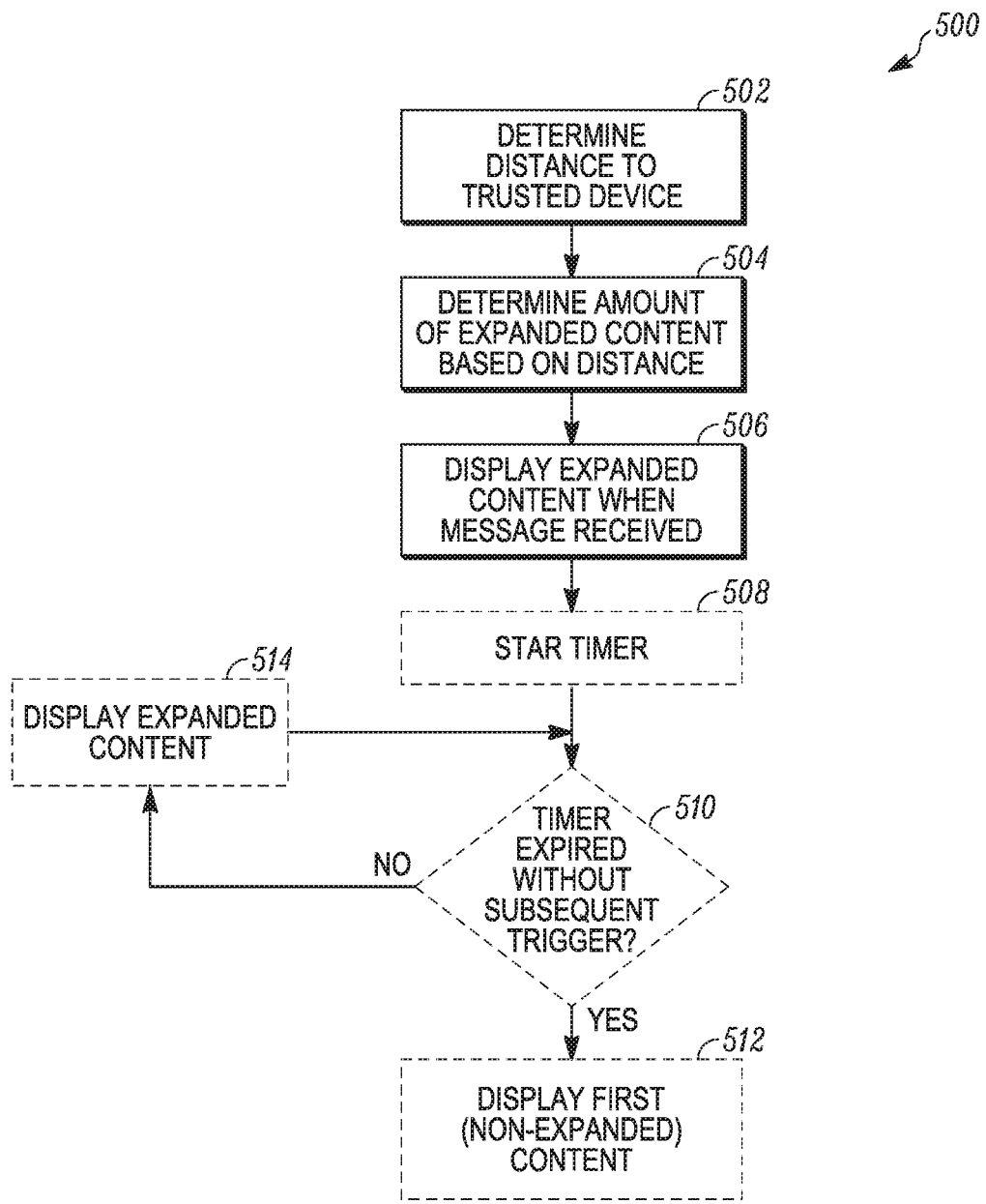
FIG. 5 is a logical flowchart illustrating a method for displaying expanded content in accordance with an embodiment.

For the particular embodiment illustrated by reference to FIG. 5, an amount of content included within the expanded content depends on a distance of the trusted device from the electronic device 102. Accordingly, the method 500 includes the device 102 determining 502 the distance to the trusted device 502. This can be done, for instance, using the proximity sensors within the sensor hub 208 to determine an actual distance or by comparing the RSSI to various ranges of signal strengths, wherein each range of signal strength is associated with an approximate distance or range of distances.

The device 102 then determines 504 the amount of expanded content to display based on the distance. For instance, the device 102 stores a table or some other data structure in the memory component 220, which associates an amount of content with each range of a plurality of distance ranges. For one example, when the trusted device is determined 502 to be a few inches from the electronic device 102, the device 102 displays a maximum amount of expanded content, such as some or all of the substantive content within the body of the message. Moreover, where the trusted device is between 6-12 inches away, the device 102 could display a medium amount of expanded content, such as the sender's name, the subject, and a few lines of the body of the message. Whereas, where the trusted device is more than one foot away, the device 102 could display the least amount of expanded content, such as the sender's name and the subject of the message.

The electronic device 102 then displays 506 the expanded content when the next message is received that is addressed or otherwise directed to the authorized user of the device 102 instead of first content that is displayed when the trusted device is distant from the device 102. For example, the first content that is displayed when the trusted device is distant from the electronic device 102 is an icon, such as the icon 114, which indicates a message; and the expanded content that is displayed when a trusted device is proximate includes content as described above. Alternatively, the first content could be any type of default content, and the expanded content is content contained within or related to the message that is indicated using the default content.

Moreover, the expanded content can be displayed without the user interacting with the device 102. Alternatively, the device 102 displays default expanded content (the first content) in response to the user's interaction with the icon 114 when the trusted device is distant from the device 102; and the device 102 displays additional expanded content in accordance with the present teachings in response to the user's interaction with the icon 114 when the trusted device is proximate to the device 102.

For a further embodiment, the secondary processor 216 can be configured to cause the display component 212 to display 506 the expanded content under control of the primary processor 214 or under the control of prior programming of the secondary processor 216. For one example, the secondary processor 216 causes the display component 212 to display 506 the expanded content instead of the first content after determining that the trusted device is proximate to the electronic device 102. In this example implementation, the secondary processor 216 can be pre-programming to indicate to the display component 212 the amount of expanded content to display. In this example, the secondary processor 216 has access to the table or other data structure stored in the memory component 220 setting forth the amount of expanded content of the message to display.

For an alternative example, where the primary processor 214 detects proximity to the trusted device, the primary processor 214 (prior to returning to the sleep mode) can direct the secondary processor 216, using a signal or otherwise, to indicate to the display component 212 the amount of expanded content to display. In this example, the secondary processor may or may not have access to the table or other data structure stored in the memory component 220 setting forth the amount of expanded content of the message to display.

For a further embodiment, the expanded content is only temporarily displayed. This accounts for the user potentially moving away from the electronic device 102 at some time after the device 102 determines the trusted device to be proximate. One optional implementation is shown in FIG. 5. Accordingly, method 500 continues with the electronic device 102 starting 508 a timer, which is set to expire after a first time duration, and monitoring 510 whether the timer expires without the device receiving or detecting a subsequent trigger to detect 308 for the proximity of the trusted device. If the timer has not expired, the device 102 continues to display 514 expanded content as new massages come in. However, where the timer expires and no additional trigger is detected (e.g., using method 300 of FIG. 3), the device 102 displays 512 the first (non-expanded) content, e.g., the icon, upon receiving new massages.

For another embodiment, the expanded content is displayed until the device 102 detects that the trusted device is no longer proximate to the electronic device 102. For example, the device 102 detects that the trusted device has moved out of the proximity of the device 102 using proximity sensors of the sensor hub 208. Alternatively, the device 102 detects that the trusted device has moved out of the proximity of the device 102 upon losing the NFC signal from the trusted device. The device 102 might also have detected, for instance using touch sensors of the sensor hub 208, that the user is holding the trusted device when it determines that the trusted device is proximate to the electronic device 102. Therefore, upon determining using the touch sensors that the user is no longer holding the trusted device, the device 102 could return to displaying the non-expanded content. In yet another embodiment, the device 102 gradually displays less and less expanded content as the trusted device moves further and further away until the non-expanded content is being displayed when the trusted device is distant from the device 102.

Upon determining 308 that the trusted device is proximate to the electronic device 102, the device 102 can adjust 312 other aspects of its sleep mode display mechanism. For one particular embodiment, the electronic device 102 determines that the sleep mode display mechanism is deactivated, and thus adjusts the sleep mode display mechanism by activating it, at 316. For one example, normally the sleep mode display mechanism is deactivated to conserve battery power such that nothing is displayed when the device 102 is in the sleep mode. However, activating the sleep mode display mechanism allows the device 102 to adjust an amount of content displayed when the device 102 is in the sleep mode based on detecting that a trusted device is in the vicinity of the electronic device 102.

Additionally, adjusting 312 the sleep mode display mechanism could involve, the primary 214 or secondary 216 processor being configured to adjust or override 318 a manually set privacy setting of the electronic device 102 that controls the sleep mode display mechanism. For one example, the device 102 includes a privacy setting in a settings menu that is accessible to a user of the device 102. The user can manually set the privacy setting to limit content displayed on the display component 212 when the primary processor 214 is in the sleep mode. Where the user has set the privacy setting such that nothing is displayed when the device 102 is in the sleep mode, the device 102 could override this setting to allow content to be displayed based on whether the trusted device is proximate to the electronic device 102.

Both mechanisms 316 and 318 are a convenience to the user while still maintaining the user's privacy. Moreover, for a further embodiment, the device 102 activates 316 the sleep mode display mechanism or overrides or adjusts 318 the manually set privacy setting only for a temporary time duration, to further protect the user's privacy. After the temporary time duration expires, the device 102 deactivates the sleep mode display mechanism or reverts back to the privacy setting that was manually set by the user.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings. Benefits, advantages, solutions to problems, and any element(s) that may cause any benefit, advantage, or solution to occur or become more pronounced are not to be construed as a critical, required, or essential features or elements of any or all the claims.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may include of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., including a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
responsive to receiving an indication of a triggering event, determining, by an electronic device and based on information received by a sensing component of the electronic device, whether the electronic device is proximate to a trusted device that is authenticated by the electronic device;
responsive to determining that the electronic device is proximate to the trusted device, adjusting a privacy setting that controls a sleep mode display mechanism of the electronic device to determine an amount of content that is displayed at a display component of the electronic device while one or more components of the electronic device are in a sleep mode.

2. The method of claim 1, wherein the triggering event comprises a primary processor of the electronic device awakening from the sleep mode for a first time duration to perform a function before returning to the sleep mode.

3. The method of claim 1, wherein the triggering event comprises an audio trigger detected while a primary processor of the electronic device is in the sleep mode.

4. The method of claim 1, wherein the sleep mode display mechanism is set to be activated for a time duration and then deactivated after expiration of the time duration.

5. The method of claim 1, wherein adjusting the privacy setting to determine the amount of content that is displayed at the display component comprises causing the display component to display expanded content instead of first content, the display component displaying the first content when the electronic device is not proximate to the trusted device.

6. The method of claim 5, further comprising:
after expiration of a time duration without receiving an indication of another triggering event to determine whether the electronic device is proximate to the trusted device, causing the display component to display the first content instead of the expanded content.

7. The method of claim 5, wherein the first content comprises an icon that indicates a message, and wherein the expanded content comprises at least a portion of content within the message.

8. The method of claim 1, wherein determining whether the electronic device is proximate to the trusted device comprises determining whether the electronic device has received a short-range communication signal from the trusted device.

9. The method of claim 8, wherein determining whether the electronic device is proximate to the trusted device further comprises determining at least one of:
whether a signal strength of the short-range communication signal exceeds a signal strength threshold; or
whether a signal quality of the of the short-range communication signal exceeds a signal quality threshold.

10. The method of claim 1,
wherein adjusting the privacy setting comprises overriding the privacy setting for a time duration to determine the amount of the content that is displayed at the display component while the one or more components of the electronic device are in the sleep mode.

11. The method of claim 1, wherein determining the amount of the content that is displayed at the display component while the one or more components of the electronic device are in the sleep mode is based on a determined distance range from a plurality of distance ranges between the trusted device and the electronic device.

12. An electronic device comprising:
    at least one processor;
    a display component coupled to the at least one processor; and
    a sensing component coupled to the at least one processor,
    wherein the at least one processor is configured to:
        responsive to receiving an indication of a triggering event, determine, based on information received by the sensing component, whether the electronic device is proximate to a trusted device that is authenticated by the electronic device; and
        responsive to determining that the electronic device is proximate to the trusted device, adjust a privacy setting that controls a sleep mode display mechanism of the electronic device to determine an amount of content that is displayed at the display component of the electronic device while one or more of the display component or the at least one processor are in a sleep mode.

13. The electronic device of claim 12, wherein the at least one processor is configured to adjust the privacy setting to determine the amount of content that is displayed at the display component by causing the display component to display expanded content instead of displaying first content, the display component displaying the first content when the electronic device is not proximate to the trusted device.

14. The electronic device of claim 12, wherein the at least one processor includes a primary processor and a secondary processor, and wherein the primary processor is configured to:
    periodically awaken from the sleep mode to an awake mode for a first time duration to perform a function and, during the first time duration, to operate with the sensing component to determine whether the electronic device is proximate to the trusted device; and
    responsive to determining that the electronic device is proximate to the trusted device, signal the secondary processor to adjust the privacy setting that controls the sleep mode display mechanism of the electronic device to determine the amount of content that is displayed at the display component.

15. The electronic device of claim 12,
    wherein the at least one processor includes a primary processor and a secondary processor,
    wherein the electronic device further comprises an audio input component,
    wherein the secondary processor is configured to monitor input into the audio input component for an audio trigger while the primary processor is in the sleep mode, and
    wherein the audio trigger is the triggering event that initiates determining whether the electronic device is proximate the trusted device.

16. The electronic device of claim 12,
    wherein the at least one processor is configured to adjust the privacy setting at least by being configured to override the privacy setting for a time duration to determine the amount of the content that is displayed at the display component while one or more of the display component or the at least one processor are in the sleep mode.

17. The electronic device of claim 12, wherein the at least one processor is configured to determine the amount of the content that is displayed at the display component while one or more of the display component or the at least one processor are in the sleep mode based on a determined distance range from a plurality of distance ranges between the trusted device and the electronic device.

18. The electronic device of claim 12, wherein the sensing component comprises a short-range communication component.

19. The electronic device of claim 18, wherein the at least one processor is configured to determine whether the electronic device is proximate to the trusted device at least by being configured to determine whether the short-range communication component has received a short-range communication signal from the trusted device.

20. The electronic device of claim 19, wherein the at least one processor is further configured to determine whether the electronic device is proximate to the trusted device by determining at least one of:
    whether a signal strength of the short-range communication signal exceeds a signal strength threshold; or
    whether a signal quality of the of the short-range communication signal exceeds a signal quality threshold.

* * * * *